United States Patent
Lugo

(10) Patent No.: US 8,870,502 B2
(45) Date of Patent: Oct. 28, 2014

(54) MULTI-FUNCTION WINCH SYSTEM FOR SECURING CARGO TO A TRANSPORT VEHICLE

(71) Applicant: Paul Lugo, Fontana, CA (US)

(72) Inventor: Paul Lugo, Fontana, CA (US)

( * ) Notice: Subject to any disclaimer, the term of this patent is extended or adjusted under 35 U.S.C. 154(b) by 0 days.

(21) Appl. No.: 13/815,388

(22) Filed: Feb. 27, 2013

(65) Prior Publication Data

US 2014/0241825 A1 Aug. 28, 2014

(51) Int. Cl.
*B61D 45/00* (2006.01)
*B60P 7/08* (2006.01)

(52) U.S. Cl.
CPC .................................... *B60P 7/083* (2013.01)
USPC ........................................................... 410/96

(58) Field of Classification Search
USPC ............... 410/96, 7, 23, 12, 100, 20, 10, 103; 24/68 CD, 69 CT, 69 ST, 909; 254/223, 254/217, 218, 376; 242/396.4, 406
See application file for complete search history.

(56) References Cited

U.S. PATENT DOCUMENTS

| | | | | |
|---|---|---|---|---|
| 5,314,275 A | * | 5/1994 | Cottrell et al. | 410/26 |
| 5,441,371 A | * | 8/1995 | Erke | 410/100 |
| 6,626,621 B1 | | 9/2003 | Hugg | |
| 6,960,053 B2 | | 11/2005 | Woodruff | |
| 7,360,978 B2 | * | 4/2008 | Howes | 410/7 |
| 7,484,917 B2 | * | 2/2009 | Howes | 410/12 |
| 2002/0195594 A1 | * | 12/2002 | Cauchon | 254/243 |
| 2003/0031524 A1 | * | 2/2003 | Brunet | 410/100 |
| 2003/0082022 A1 | * | 5/2003 | Botelho | 410/100 |
| 2004/0013490 A1 | * | 1/2004 | Cauchon | 410/103 |
| 2006/0083598 A1 | * | 4/2006 | Ruan | 410/103 |
| 2006/0197072 A1 | * | 9/2006 | Huang | 254/217 |
| 2008/0304932 A1 | * | 12/2008 | Leggett et al. | 410/100 |
| 2009/0047091 A1 | * | 2/2009 | Huck | 410/100 |
| 2009/0241741 A1 | * | 10/2009 | Howes et al. | 81/63.2 |
| 2011/0067210 A1 | * | 3/2011 | Huang | 24/68 CD |
| 2011/0083529 A1 | * | 4/2011 | Ruan | 74/577 R |
| 2011/0176884 A1 | * | 7/2011 | Ruan | 410/103 |
| 2011/0204306 A1 | * | 8/2011 | Kingery | 254/391 |
| 2012/0233824 A1 | * | 9/2012 | Breeden et al. | 24/68 CD |
| 2012/0257942 A1 | * | 10/2012 | Empey | 410/3 |

OTHER PUBLICATIONS

Paul Lugo, Photograph of a Multi-Function Winch Offered for Sale and Sold on Jun. 26, 2012.

* cited by examiner

*Primary Examiner* — Kiran B Patel
(74) *Attorney, Agent, or Firm* — Harold L. Jackson

(57) ABSTRACT

A ratchet drive winch for securing cargo to a transport vehicle includes a shaft rotatably mounted on the vehicle, the shaft receiving one end of a flexible tie down member. A lever arm, rotatably mounted on the shaft, controls a ratchet gear fixed to the shaft through a pawl. The lever arm pawl causes the shaft to follow the lever arm as it is rotated in one direction. A holding pawl mounted on the frame prevents the shaft from rotating in the opposite direction so that as the lever arm is moved back and forth the shaft is rotated removing slack in the tie down member. The lever arm pawl can be manually retracted to disengage from the ratchet gear and is configured to selectively retract the holding pawl allowing the shaft to freely rotate.

5 Claims, 9 Drawing Sheets

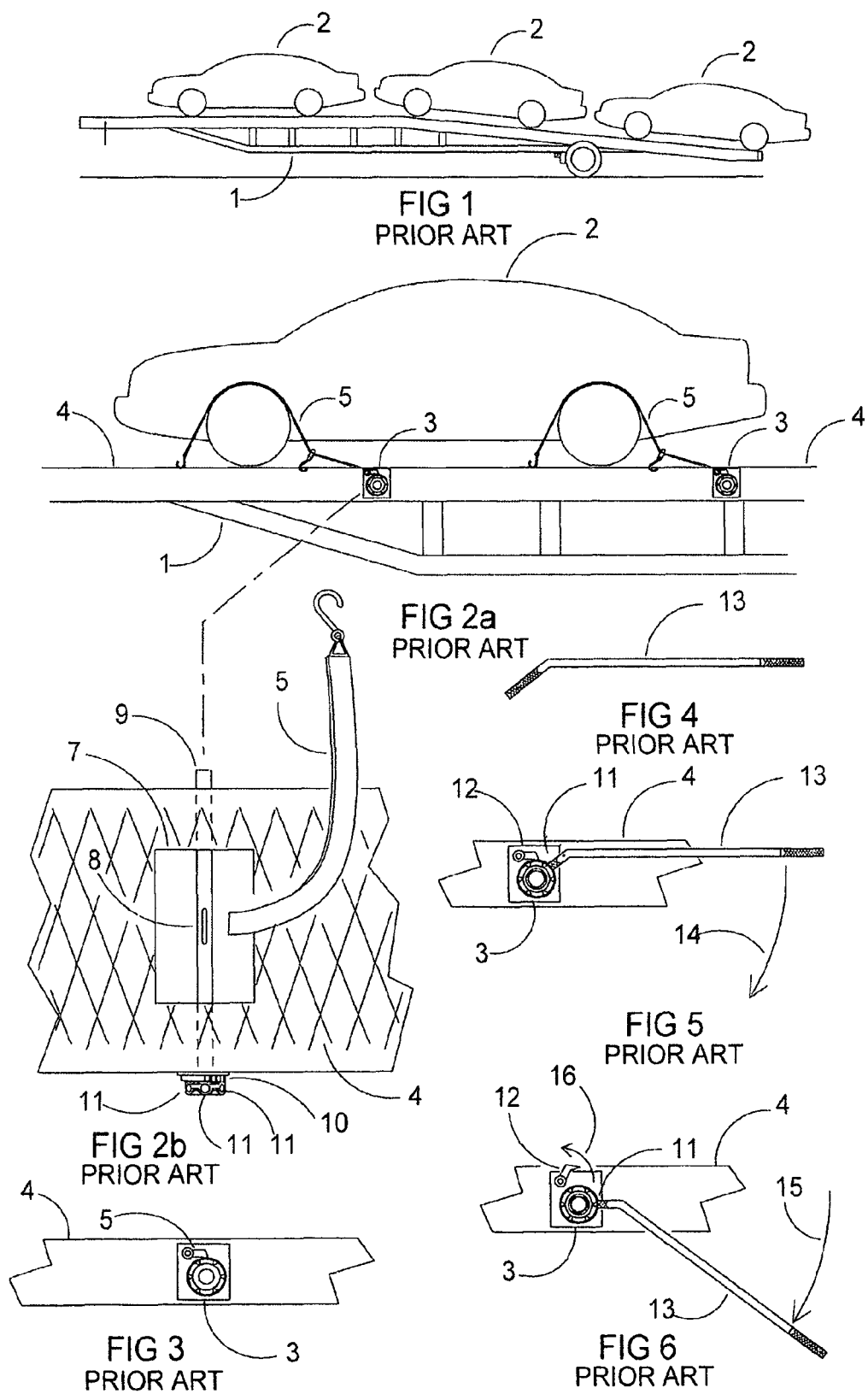

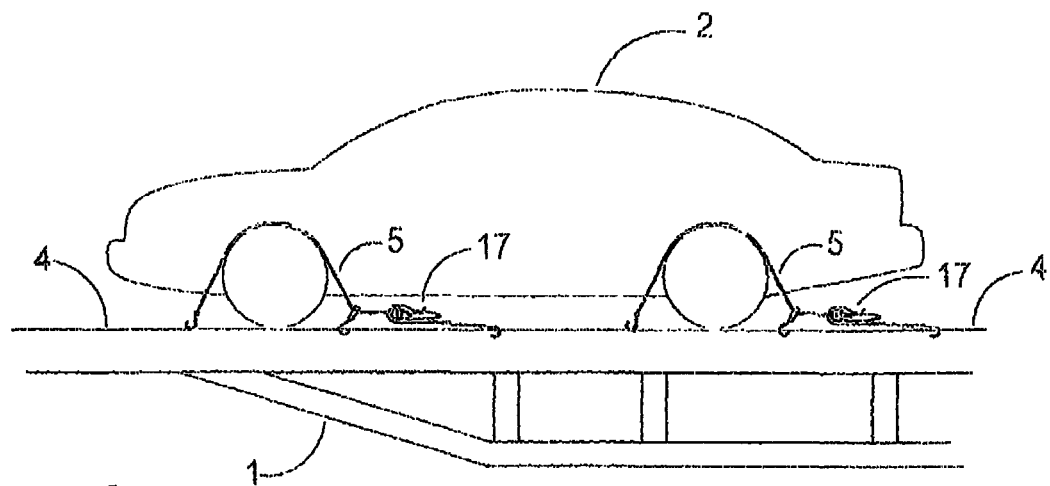
FIG 7
PRIOR ART
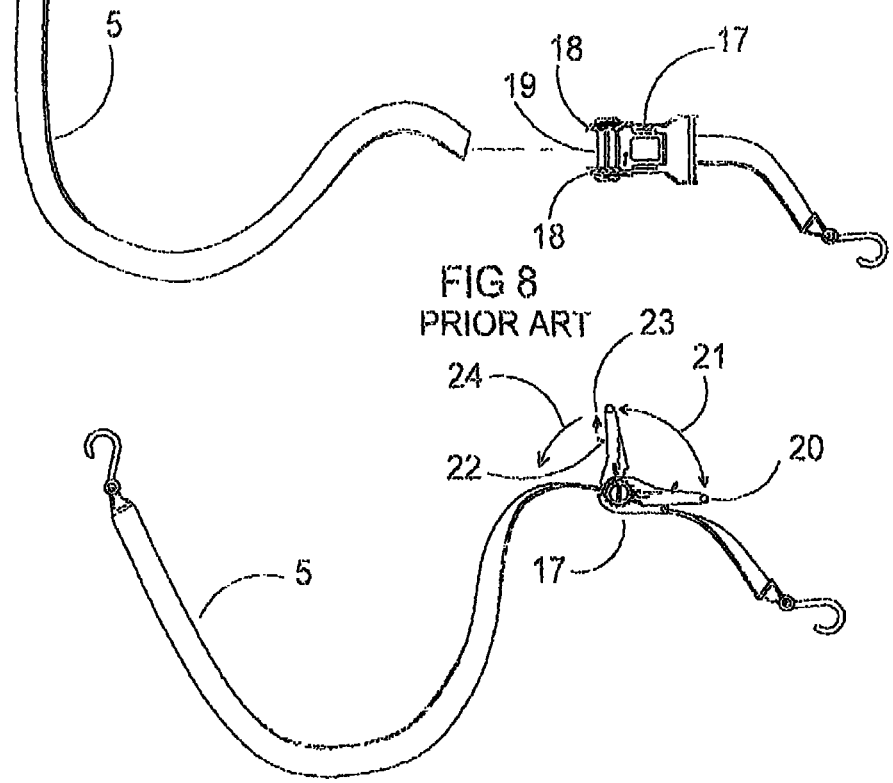
FIG 8
PRIOR ART
FIG 9
PRIOR ART

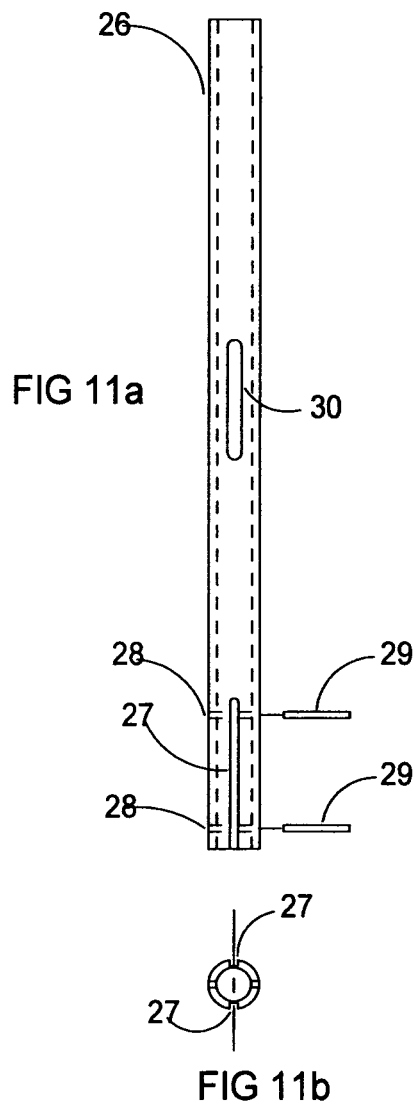
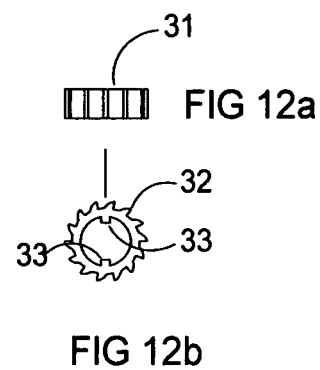
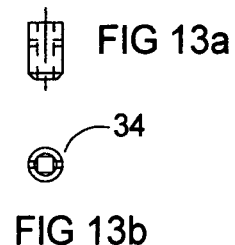

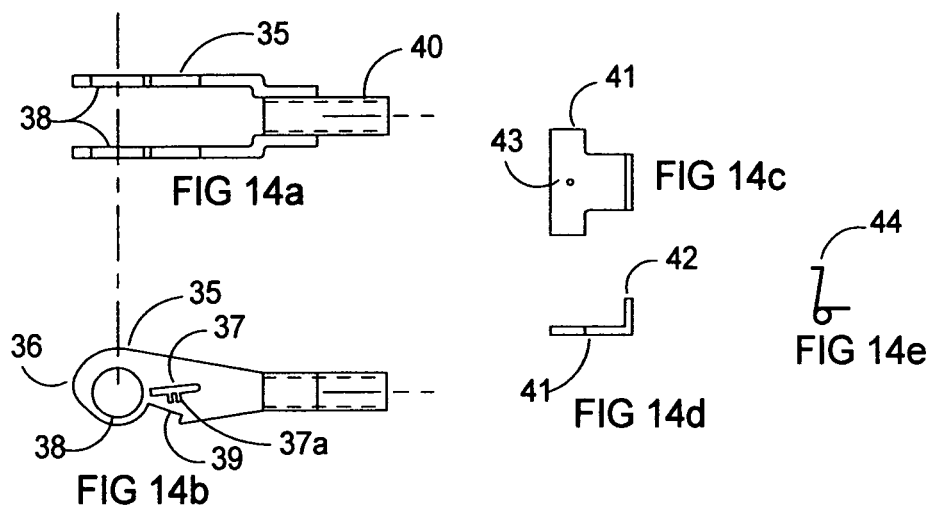
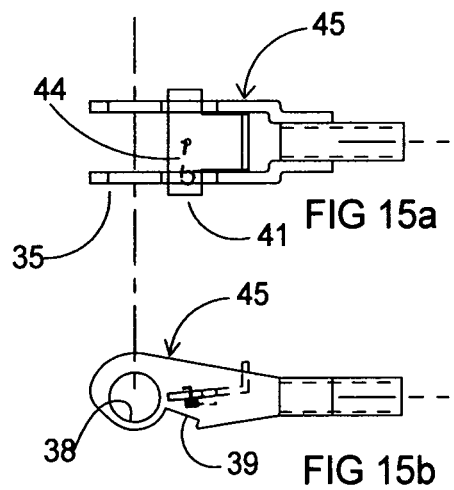

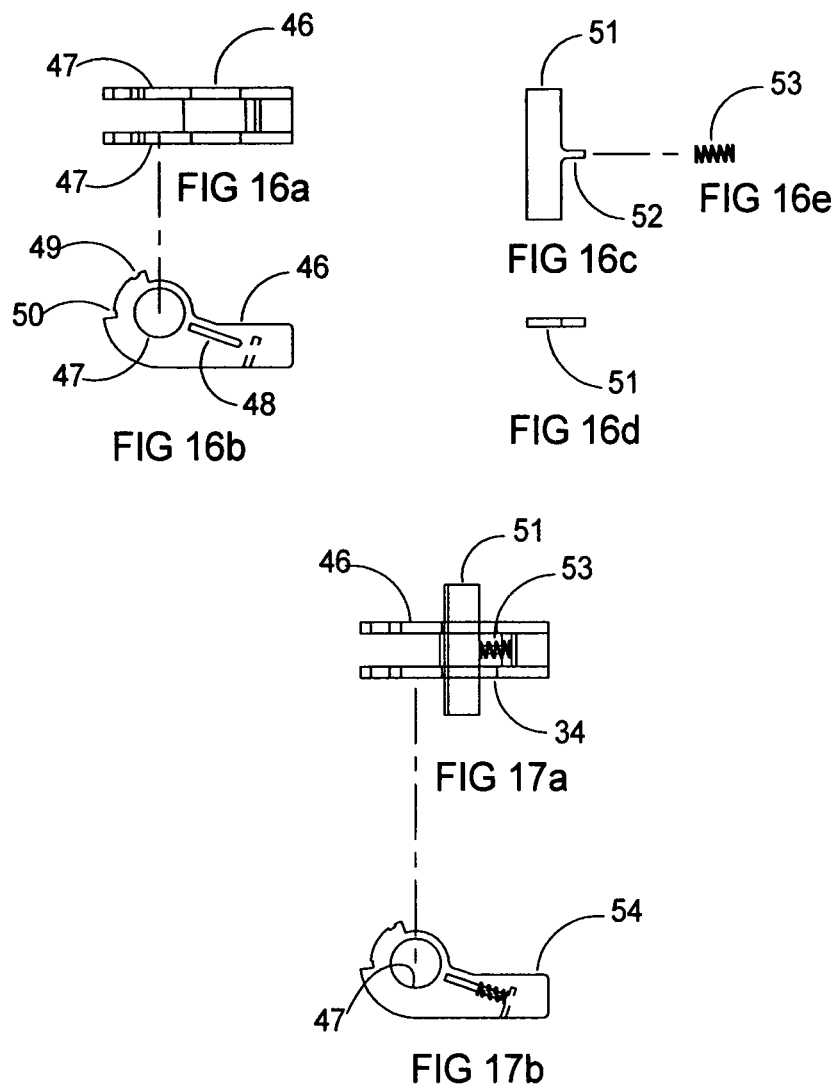

MULTI-FUNCTION WINCH SYSTEM FOR SECURING CARGO TO A TRANSPORT VEHICLE

RELATED APPLICATION

This application is based on and claims priority of U.S. Provisional Application 61/685/475 filed on Mar. 19, 2012, the contents of which are incorporated herein by reference.

FIELD OF THE INVENTION

The present invention relates to manually operated winches used to secure cargo on transport vehicles such as trucks, trailers railcars, ships and airplanes.

BACKGROUND OF THE INVENTION

This disclosure concerns manually operated winches for use to secure cargo on the above type of vehicles. When cargo needs to be secured for transport it is common to use a flexible tie down such as web type straps, chains, or ropes. It is common for these various types of tie down members to be tightened to secure the cargo with a manually operated winch. For example, it is common on a trailer designed to transport automobiles to secure each vehicle with multiple flexible tie downs and manually operated winches.

One type of prior art winch (shown in FIGS. 1-6 herein) is a style that is transversely mounted to a transport vehicle frame such as an automobile transporter and requires the use of a handle commonly referred to as a tie down bar to be inserted into a receiver and is used to provide an axially directed force causing rotational movement of the shaft which draws the flexible tie down taut. A single pawl is used to engage the ratchet gear teeth and keeps the shaft of the ratchet mechanism in its taut position. Prior art tie downs of the type differentiate themselves in how they utilize the handle or tie down bar to disengage the pawl from the ratchet gear teeth. Additionally, in these designs the operation of shaft rotation and the operation of the pawl are independent of one another and both require the use of a handle or tie down bar to be inserted into separate receivers to accomplish their functions. This type of winch cannot be operated by hand alone without the use of a handle or tie down bar and it is a common problem to lose the handle or tie down bar at an inopportune time which renders the operator unable to either tighten or loosen the winch.

It is also common that the operator may check the tightness of the flexible tie downs securing the cargo during transit and find that one or more has become loose due to vibration or other over the road conditions. If upon this discovery the operator finds they are without a suitable handle or tie down bar there is at least the inconvenience of securing another handle and at worst if a handle or tie down bar cannot be obtained and the operator continues on to the intended destination with the cargo being left as is in a possibly unsafe condition.

Another common manually operated winch (shown in FIGS. 7-9 herein) is of a style that is not transversely mounted to the transport vehicle and as such is a loose device that the operator places wherever it is needed and is designed to be used exclusively with strap type flexible tie downs. This type of winch is configured such that the rotation of the shaft is accomplished with a back and forth movement of a lever arm by hand alone. It is further configured with two ratchet gears, having one on each end of the shaft, and the shaft area between the two gears being configured to attach a trap type flexible tie down. Additionally, the operation of a pawl is also accomplished by hand alone.

Of the two types of prior art winches described herein the first is preferable over the second type for several reasons. One reason is that the first type being of a transversely mounted configuration makes it more suitable to secure cargo, such as an automobile, to the transport vehicle. Another reason is since it is mounted to the transport vehicle frame and not a loose device it is less time consuming for the operator to use. With a transport vehicle such as an automobile transport there can be as many as forty such winches required to safely secure all of the automobiles and because the second type of winch requires more time to be positioned and utilized it results in loss of productivity. Another reason is that the use of a handle or tie down bar is a preferred method of rotating the shaft over being rotated by hand alone because the extended length of the tie down bar increases leverage and reduces the physical stress required to draw the flexible tie down tight and secure the load. Additionally, with this second type of winch not being suitable to be transversely mounted to the transport vehicle frame it further burdens the operator with multiple additional tasks such as having adequate storage and the prevention of winches being lost or stolen.

The above prior art styles have long been considered as industry standards and adequate for their intended use and this factor has reduced the incentive for the skilled artisan to attempt to develop an improved ratchet drive winch mechanism, in my opinion.

One of the objectives of this invention is to configure a manually operated ratchet winch mechanism that is suitable to be transversely mounted to a transport vehicle and can be operated wither by hand alone or with a handle or tie down bar for the purpose of providing rotation of the shaft and providing operation of a pawl.

Another objective of this invention is to configure a manually operated ratchet drive winch mechanism suitable to be transversely mounted to a transport vehicle that can receive an air powered, electric powered, or hand operated winch thereby providing additional optional means of rotating the shaft.

An additional objective of this invention is to provide a transversely mounted manually operated ratchet winch mechanism with a lever arm that rotates the shaft with a continual back and forth movement thereby eliminating the need to insert a handle in one receiver position, rotate, remove the handle, reinsert into a different receiver position, and rotate again until the flexible tie down is tight.

Another objective of this invention is to provide a manually operated ratchet drive winch mechanism that eliminates the use of a handle or tie down bar for the purpose of disengaging a pawl from the ratchet gear to allow the shaft to rotate freely.

SUMMARY OF THE INVENTION

A multi-function winch system in accordance with this invention, for use on transport vehicles, includes a shaft adapted to be rotatably mounted on the vehicle frame with the shaft arranged to receive one end of a flexible tie down member secured thereto and rotatable therewith, the other end of the tie down member being arranged to be secured to a selected location on the vehicle frame. A ratchet gear, having radially extending teeth, is mounted on the shaft for rotation therewith. A lever arm assembly, mounted on the shaft, is arranged to be repeatedly moved through an arc from a first to second location. A first or lever arm pawl travels with the lever arm and in its deployed position engages the gear teeth to cause the shaft to follow the lever arm as it rotates from a first to a second location (i.e., rotating in one direction) while allowing the lever arm to return to the first position. A pivot frame securing a second or holding pawl is also mounted to the vehicle frame and the pawl in its deployed position engages the gear teeth to prevent the shaft from returning to the first location (rotating in the opposite direction) after movement of the level arm. The first and second pawls having a retracted position in which the pawls are disengaged from the ratchet gear allowing the shaft to freely rotate in either direction removing the tension on the tie down member.

Preferably the lever assembly comprises an outer U-shaped member at one end bracketing the ratchet gear with aligned openings through which the shaft passes and terminating in a handle receiver at the other end, the lever arm pawl being slidably mounted in the outer U-shaped member and biased toward the gear. The holding pivot frame may comprise an inner U-shaped member bracketing the gear with aligned openings through which the shaft passes, the holding pawl being slidably mounted therein and biased toward the gear.

The lever arm pawl preferably includes a manually operable finger pull tab allowing the pawl to be retracted. In addition, a wrench receiving plug may be secured to the shaft to allow the shaft to be rotated independently of the lever arm.

Preferably the lever arm U-shaped member is formed with a radially extended surface above the openings defining a level arm pawl detent at a third lever location arranged to engage and maintain the lever arm pawl in its retracted position to facilitate the use of the wrench receiving plug. Also the holding pawl frame may be formed with a cam surface under the openings for engaging and retracting the pivot frame pawl when the lever arm is rotated to the fourth location.

BRIEF DESCRIPTION OF THE DRAWINGS

FIG. 1 is a side view of a transport vehicle used for the purpose of transporting automobiles.

FIGS. 2a and 2b are a side view of a transport vehicle with a transversely mounted prior art winch attached to the frame and a close up plan or top view of the winch as mounted, respectively.

FIG. 3 is an end or side view of the winch of FIG. 2b.

FIG. 4 is an illustration showing a handle commonly referred to as a tie down bar.

FIG. 5 is an illustration to show how the tie down bar is used to rotate the ratchet gear and shaft of a prior art winch.

FIG. 6 is an illustration of how the tie down bar is used to release the pawl of a prior art winch.

FIG. 7 is a close up of a portion of a transport vehicle illustrating a non-mounted prior art manually operated ratchet drive winch.

FIG. 8 is a top view of the non-mounted prior art manually operated ratchet drive winch.

FIG. 9 is an end view illustration showing the operation of the non-mounted prior art manually operated ratchet drive winch.

FIG. 10a is a side view of a portion of a transport vehicle having two transversely mounted manually operated ratchet drive winches of this invention.

FIG. 10b is a close up side or end view of the winch of FIG. 10a.

FIGS. 11a and 11b are a top view and end view, respectively, of a shaft forming a part of this invention.

FIGS. 12a and 12b are a top and end view, respectively, of the ratchet gear of this invention.

FIGS. 13a and 13b are a top and end view, respectively, of the wrench receiving plug of this invention.

FIGS. 14a and 14b are a top and end (side) views, respectively, of a lever arm forming a part of the lever arm assembly of the present invention.

FIGS. 14c, 14d, and 14e are a top or plan view of a level arm pawl, a side view of the pawl and a side view of a pawl spring, respectively, forming additional parts of the lever arm assembly.

FIGS. 15a and 15b are a top and end view, respectively, of the assembled lever arm assembly.

FIGS. 16a and 16b are a top and end view, respectively, of the pivot frame.

FIGS. 16c, 16d, and 16e are a top view of the pivot or holding pawl, side view of the pawl and a side view of the pawl spring, respectively.

FIGS. 17a and 17b are a top and end view of the assembled pivot frame, respectively, of the winch mounted on a transport vehicle frame with tie down member extending from the shaft.

DESCRIPTION OF THE PREFERRED EMBODIMENT

Discussion of the Prior Art

Figures 10A, 10B:
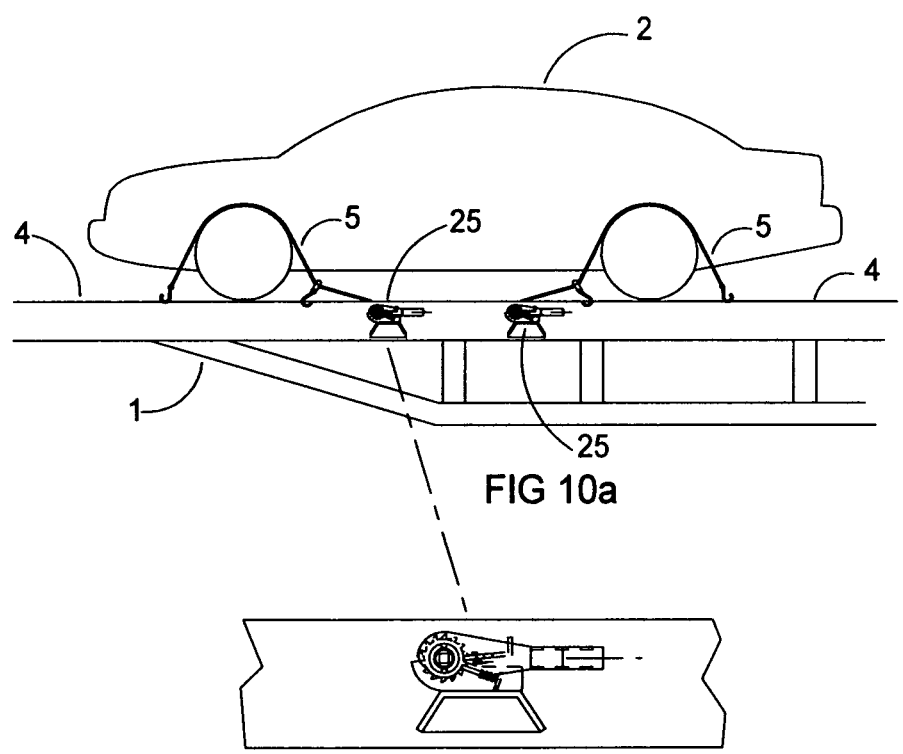

Referring now to the drawings, FIG. 1 illustrates a transport vehicle which for the purposes of this invention is a trailer used to transport automobiles 2 shown on the trailer.

FIG. 2a shows a portion of a transport vehicle 1 with one type of prior art winch 3 transversely mounted relative to the transport vehicle frame 4 and a flexible tie down strap 5 used to secure the cargo.

FIGS. 2b and 3 are, respectively, a close up top and end view portion of the transversely mounted prior art winch 3 with an opening 6 shown in the top view of the frame 4, and a slot 8 through the shaft 9 used to attach the flexible tie down strap 5 which then wraps around the shaft 9 as it rotates until it is taut, thus securing the cargo such as an automobile. The shaft 9 is connected to a ratchet gear 10 and multiple axially spaced receivers attached to a ratchet gear 10 with which to insert a handle or tie down bar 13 (FIG. 4) used to rotate the ratchet gear 10 and shaft 9. Pawl 12 (FIG. 4) is used to engage the ratchet 10 and keep the shaft in its taut position.

FIG. 5 illustrates a tie down bar 13 inserted into a receiver 11 for the purpose of providing rotation of the ratchet gear 10 and shaft 9 from first location to a second location as indicated by the arrow 14. The pawl 12 alternately disengages and then reengages with the ratchet gear 10 as the tie down bar 13 provides an axially directed force which rotates the ratchet gear 10 and shaft 9. Additionally, the pawl 12 being engaged with the ratchet gear 10 only allows the shaft 9 to rotate in one direction as indicated by arrow 14. Typically due to the ease of use, space restrictions, or the location of the winch system 3 on the trailer frame the handle 13 is extracted from the receiver 11 and reinserted in a different receiver 11 position followed by another axial movement of the handle 13. This removal of the handle 13 from a receiver 11 position and reinsertion of the handle 13 into a different receiver 11 position followed by another axial movement of the handle 13 indicated by the arrow 14 continues repeatedly until the tie down strap 5 is drawn tight.

In FIG. 6 the pawl 12 is shown released from being engaged with the ratchet gear 10. This is accomplished by inserting the handle 13 into a receiver 11 and moving the handle 13 axially as indicated by the arrow 15 with one hand and with a second hand moving the pawl 12 axially as indicated by arrow 16 disengaging the pawl 12 from the ratchet gear 10 which allows the shaft 9 to rotate freely in either direction.

One prior art transversely mounted winch system claims an improved method of disengaging the pawl by using the handle 13 to push against a spring loaded pawl that is configured to move laterally and in line with the axis of rotation. With the ratchet gear remaining fixed in its location the pawl is sufficiently moved by the handle 13 laterally and in line with the axis of rotation away from the ratchet gear sufficiently to disengage it.

Another prior art transversely mounted winch system claims an improved method of disengaging the pawl, achieved by using the handle 13 to push against a spring loaded ratchet gear configured to move laterally and in line with the axis of rotation. With the pawl remaining fixed in its location the ratchet gear is sufficiently moved by the handle 13 laterally and in line with the axis of rotation to disengage the pawl.

FIG. 7 shows a portion of a transport vehicle 1 with another type of prior art winch which is not mounted to the transport vehicle frame 4 and as such is a loose device that the operator places wherever it is needed and is designed to be used exclusively with a flexible tie down strap 5.

FIG. 8 is a close up top view of a non-mounted prior art winch 17 commonly configured with two ratchet gears 18, having one on each end of the shaft 19, and the shaft area between the two gears being configured to attach a flexible tie down strap 5.

FIG. 9 illustrates how winch 17 is configured such that the rotation of the shaft is accomplished with a back and forth movement of a handle 20 by hand alone as indicated by the arrow 21. It is further configured such that the release of a pawl is accomplished again by hand alone, pulling the pawl with the finger tab 22 as indicated by the arrow 23 and then further rotating the handle 20 as indicated by the arrow 24 thus allowing the shaft 19 to turn freely.

Discussion of the Invention

FIGS. 10a and 10b show a portion of a transport vehicle 1 with the manually operated ratchet drive winch mechanism 25 of this invention transversely mounted to the transport vehicle frame 4 and a flexible tie down strap 5 used to secure the automobile 2.

Referring now to FIGS. 11a and 11b the ratchet drive mechanism 25 of this invention includes a shaft 26 adapted to be rotatably mounted on the transport vehicle frame. The shaft has two keyways 27, 180 degrees apart at one end, to through cross holes 28 for receiving spring pins 29, and a through slot 30 to provide a means of attaching a flexible tie down member 5 thus being additionally rotatable therewith.

Referring to FIGS. 12a and 12b a ratchet gear comprises a series of radially extending teeth 32 spaced around the axis and a circular center opening 32a with two keyway tangs 33 configured to match the keyways 27 on the end of the shaft 26 for mounting on and rotation therewith. A square holed wrench receiving plug 34, shown in FIGS. 13a and 13b, is configured to fit in the end of the shaft 26 and held in place with a spring pin 29.

Figure 19:
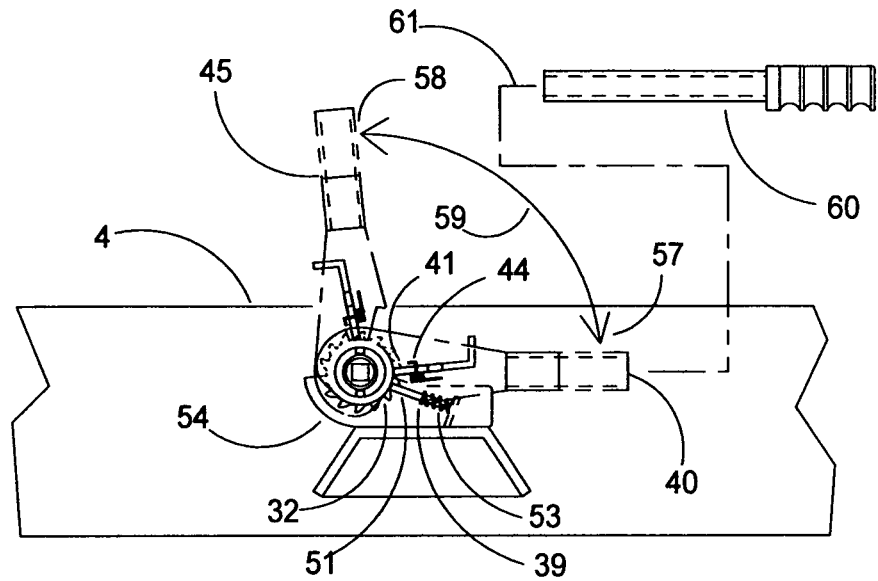
FIG. 19 is an end view of this invention illustrating the operation of rotating the shaft by hand or with a removable handle.

Referring now to FIGS. 14a and 14b a lever arm 35 is shown in the form of a forwardly extending frame member at one end having aligned openings 38 for receiving the shaft 26 so that the frame brackets the ratchet gear in the final assembly as is shown in FIG. 28a. The lever arm 35 terminates at the other end in a rearwardly extending cylindrically shaped handle receiver 40, as is illustrated in FIGS. 14a, 14b and 19. The lever arm provides an axially directed force to the ratchet gear 32 to repeatedly rotate the gear and shaft through an arc from a first location (57, FIG. 19) to a second location (58) as will become apparent. The lever arm is configured with a cam lobe 36, a level arm pawl slot 37 with spring tang 37a, a catch 39, and a handle receiver 40. A lever arm pawl 41 (FIGS. 14c and 14d), sildably received in the slot 37, is configured with a finger pull tab 42 and spring attachment hole 43. A lever arm pawl spring 44 (FIG. 14c) is configured to urge the lever arm pawl 42 to remain in its deployed position and engaged with the ratchet teeth 32 of the ratchet gear 31. An assembled lever arm assembly is shown in FIGS. 15a and 15b.

Referring now to FIGS. 16a and 16b, a pivot frame 46 is configured with aligned shaft pivot holes 47, a pivot frame pawl slot 48, and first and second detents 49 and 50 formed on a radially extended surface 49a. The pivot frame, like the lever arm brackets the ratchet gear in the final assembly with the pivot frame being located inwardly of the lever arm frame. See FIG. 18a. A pivot frame (or holding) pawl 51 (FIGS. 16c and 16d) is configured with a spring tang 52, and a pawl frame 53 (FIG. 16c) used to urge or bias the pivot frame pawl 51 to remain in its deployed position and engaged with the teeth 32 of the ratchet gear 31 thereby providing the shaft from returning to the first location after movement of the lever arm. The pivot frame assembly 54 is shown in FIGS. 17a and 17b.

Figure 18A:
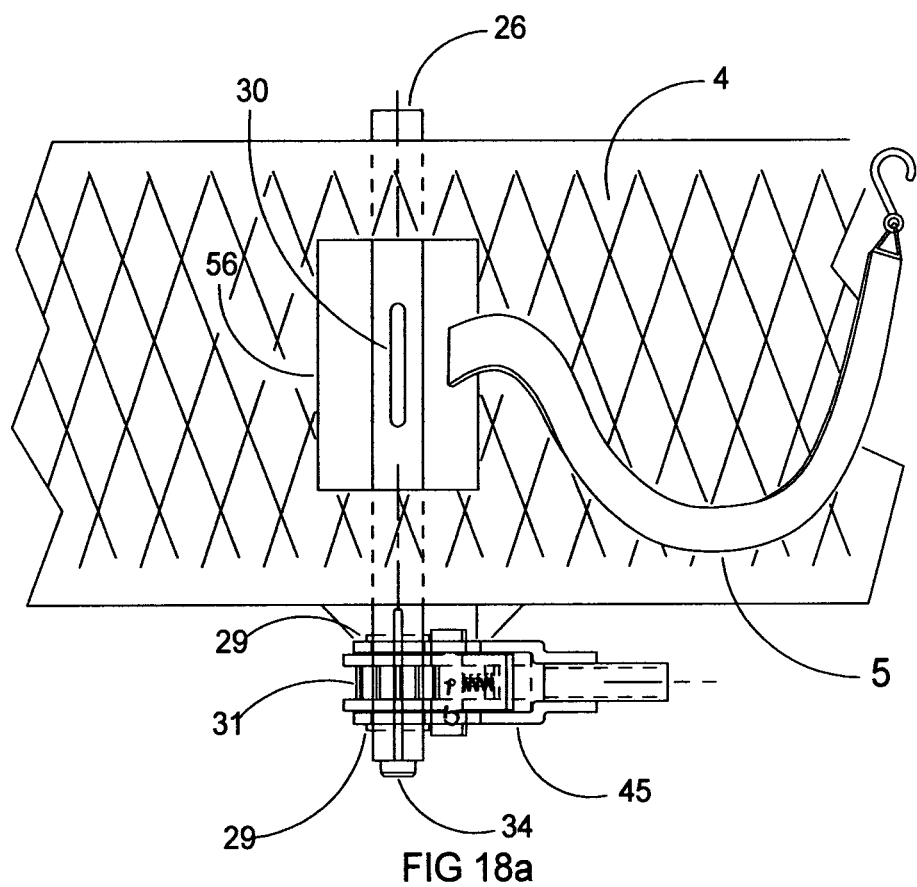
FIGS. 18a and 18b are a top view of the winch mounted on a transport vehicle frame with a tie down member extending from the shaft and an end and/or side view of the winch as mounted, respectively.

FIG. 18a shows a portion of the transport vehicle frame 4 configured with the manually operated ratchet drive winch mechanism components of this invention consisting of the shaft 26, the ratchet gear 31, the lever arm assembly 45, the pivot frame 54, the two spring pins 29, the square holed wrench receiving plug, receiver 34, and a bracket 55 is shown to illustrate a means with which to attach the winch system to the transport vehicle frame 4.

Reference 56 of FIG. 18a shows an opening in the transport vehicle frame 4 which provides access for a flexible tie down strap 5 to be attaches to the shaft 26 by means of the slot 30 which then wraps around the shaft 26 as it rotates until it is taut, thus securing the cargo such as an automobile.

Figure 18B:
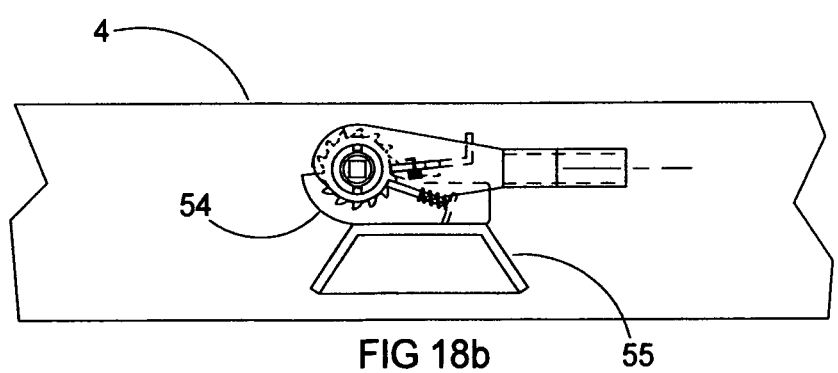

FIG. 18b is a side or end view of the winch as mounted on the frame.

One method of controlling the rotation of the shaft is accomplished as the lever arm assembly 45 is moved axially from a first location 57 to a second location 58 (i.e., rotated through an angle in one direction) as indicated by the arrow 59 of FIG. 19. The lever arm assembly 45 having a lever arm pawl spring 44 urging the lever arm pawl 41 to remain in its deployed position and engaged with the ratchet teeth 32 causes the ratchet gear 31 to rotate axially from a first location to a second location. As discussed previously, the ratchet gear 31 being attached to the shaft 26 by means of a circular center opening with the two keyway tangs 33 of the ratchet gear 31 interlocking with the matching keyways 27 at one end of the shaft 26 causes the shaft 26 to rotate therewith about its axis. As the first axial movement of the lever arm, ratchet gear, and shaft is accomplished, the pivot frame 54 with a pivot frame pawl spring 53 urging a pivot frame pawl 51 to remain in its deployed position and engaged with the ratchet teeth 32 of the ratchet gear 31 stays fixed in its location relative to the axial of angular movement of the lever arm assembly 45 and as the ratchet gear 31 rotates about its axis the pivot frame pawl 51 is caused to retract sufficiently to disengage and then reengage the ratchet gear 31 with the passing of each individual tooth of the radially extending series of teeth 32.

With lever arm assembly 45 thus completing its first axial movement from a first location 57 to a second location 58 a second axial movement of the lever arm assembly indicated by the arrow 59 of FIG. 19 returns the level arm assembly 45 back to its first location 57. Additionally, as the lever arm assembly 45 is moving axially back to the first location 57, the pivot frame pawl 51 being spring biased to remain deployed and engaged with the ratchet gear 31 prevents the ratchet gear 31 and the attached shaft 26 from returning to the first location after the movement of the lever arm. With the ratchet gear 31 and the shaft 26 positionally fixed by the deployed pivot frame pawl 51, the lever arm pawl 41 being a component of the lever arm assembly 45 and being compelled to move axially with the lever arm assembly 45 back to the first location 57 is caused to disengage and then reengage with the ratchet gear 31 as the lever arm pawl 41 passes each individual tooth of the series of teeth 32.

Repeated axial movement of the lever arm assembly from the first location 57 to the second location 58 and then back to the first location 57, as indicated by the arrow 59 of FIG. 19, causes the ratchet gear 31 and the attached shaft 26 to continue rotating axially in the same direction and, additionally, causes the flexible tie down strap 5 to wrap around the shaft 26 until it is drawn tight thus securing the cargo.

With the flexible tie down strap 5 drawn tightly the lever arm assembly 45 is left positioned in its first location 57 and the catch 39 of the lever arm assembly 45 is configured such that it keeps the pivot frame pawl 51 from disengaging from the ratchet gear 31.

Additionally, this method of controlling the rotation of the shaft 26 by axially moving the lever arm assembly 45 from a first location 57 to a second location 58 and back again to the first location 57 can be achieved either by hand alone by grasping the receiver 40 of the lever arm assembly 45, or with a handle 60 of FIG. 19 by placing the end 61 of the handle 60 into the receiver 40.

Figure 20:
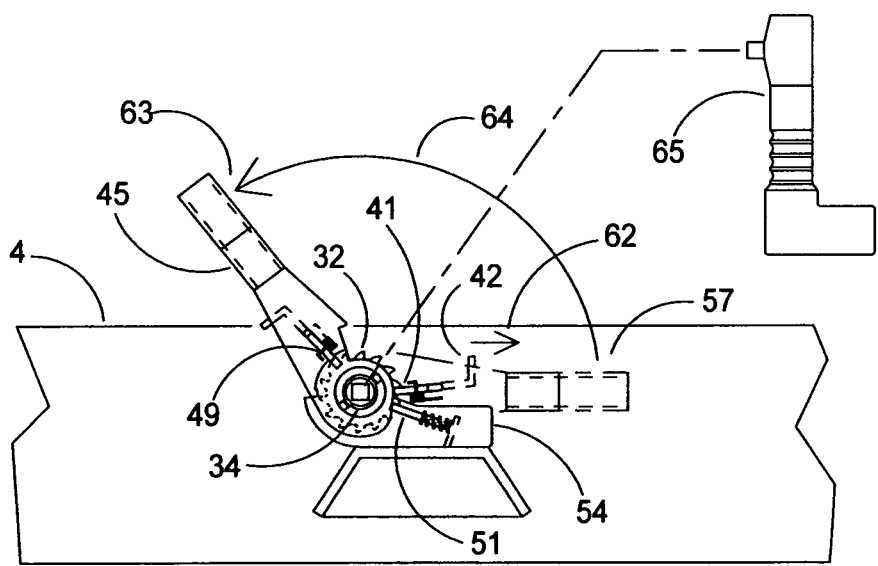
FIG. 20 is an ends view of this invention illustrating the operation of rotating the shaft with an air powered, electric powered, or manual wrench.

An additional method of controlling the rotation of the shaft 26 can be achieved by first disengaging the lever arm pawl 41 from the ratchet gear 31 by retracting the lever arm pawl 41 as indicated by the arrow 62 with the finger pull 42 of the level arm pawl 41. With the level arm pawl 41 thus disengaged the level arm assembly 45 is then moved axially from a first location 57 to a third location 63 of FIG. 20 as indicated by the arrow 64 where the lever arm pawl 41 engages with the first detent 49 of the pivot frame 46 and in this location remains fixed and disengaged from the ratchet gear 31. An air powered, electric powered, or manual square drive wrench (illustrated by reference 65 of FIG. 20) may then be inserted into the square holed receiver 34 attached on the end of the shaft 26, and with the wrench 65 being set to rotate axially and in the direction indicated by the arrow 64 is then used to control the rotation of the shaft 26.

Additionally, as the shaft 26 is caused to rotate by the wrench 65, the pivot frame pawl 51 being positionally fixed about the axis of rotation as a component of the pivot frame assembly 54 is caused to disengage and reengage with the ratchet gear as each tooth of the series of teeth 32 passes by the pivot frame pawl 51. Thus, the pivot frame pawl 51 allows the shaft to only rotate in one direction causing the flexible tie down strap 5 to wrap around the shaft 26 until it is drawn tightly the wrench securing the cargo. With the flexible tie down strap drawn tightly the wrench is removed, the lever arm pawl 41 is retracted from the first detent 49, as indicated by the arrow 62, with the finger, pull tab 42 and the level arm assembly 45 then moved axially back to its first location 57.

Figure 21:
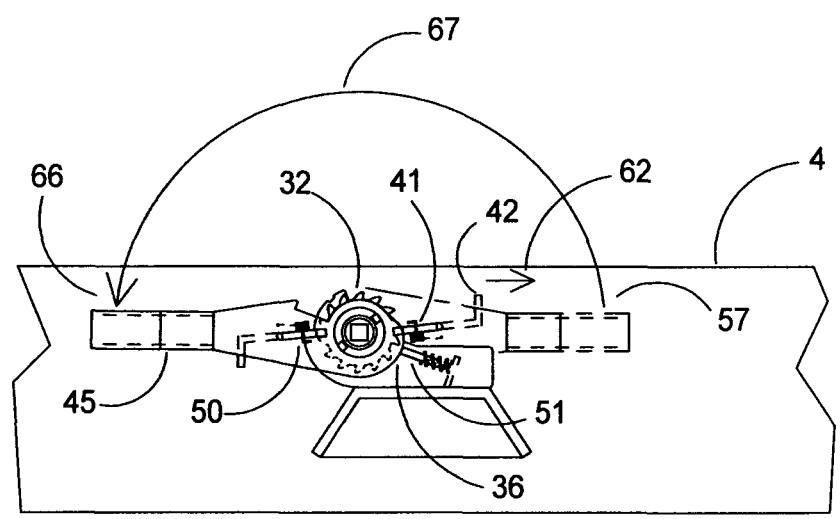
FIG. 21 is an end view of this invention illustrating the operation of disengaging the two pawls.

Releasing tension on the flexible tie down strap 5 is achieved by first manually moving the finger pull 42 of the lever arm pawl 41 of the lever arm assembly 45, as indicated by arrow 62 of FIG. 21, which retracts the lever arm pawl 41 from its spring biased deployed position. With lever arm pawl 41 thus disengaged from the ratchet gear 31 the lever arm assembly 45 if then moved axially from a first location 57 to a fourth location 66, as indicated by the arrow 67 of FIG. 21, where the lever arm pawl 41 engages with the second detent 50 of the pivot frame 46. In this location the lever arm pawl 41 is manually released, remains retracted, and disengaged from the ratchet gear 31.

Additionally, as the lever arm assembly is moving axially toward location 66 along surface 35, the cam lobe 36 of the lever arm at a certain point comes into contact with pivot frame pawl 51. The lever arm assembly 45 continues from this point moving axially to location 66, the cam lobe 36 compels the pivot frame pawl 51 to retract from its spring biased position to its retracted position and disengages from the ratchet gear 31. With the lever arm assembly in location 66 both the lever arm pawl 41 and the pivot frame pawl 51 are arranged to disengage from the series of ratchet teeth 32, thus the ratchet gear 31 with the connected shaft 26 can freely rotate in ether direction.

Conclusion

There has been herein described and illustrated a novel winch system which represents a significant improvement over the prior art. Modifications and improvements of my invention may occur to those skilled in the art without departing from the spirit and scope thereof as defined in the appended claims.

What is claimed is:

1. A multi-function winch system for releasably securing cargo to a transport vehicle frame comprising:
   a) a shaft transversely and rotatably mounted on the frame with the shaft arranged to receive an end of a flexible tie down member arranged to be secured to a selected location in the frame;
   b) a ratchet gear, having radially extending teeth, mounted on the shaft for rotation therewith;
   c) a lever arm assembly rotatably mounted on the shaft, the assembly including a lever arm with a forwardly extending U-shaped member having aligned openings at one end through which the shaft passes and terminating in a rearwardly extending handle receiver at the other end, the lever arm U-shaped member bracketing the ratchet gear and arranged to be moved through an arc from a first to a second location;
   d) a lever arm pawl carried by the lever arm, the lever arm pawl having a deployed position in which it engages the gear teeth to cause the shaft to follow the lever arm as it rotates from the first to the second location;
   e) a U-shaped pivot frame adapted to be secured to the vehicle frame with an opening through which the shaft passes, the pivot frame bracketing the ratchet gear and disposed inwardly of the lever arm U-shaped member;
   f) a holding pawl mounted on the pivot frame, the holding pawl having a deployed position in which it engages the gear teeth to prevent the shaft from returning to the first location after movement of the lever arm; and
   g) the lever arm and holding pawls having a retracted position in which the pawls are disengaged from the gear teeth allowing the shaft to rotate freely.

2. The winch system of claim 1 wherein the lever arm terminates in a rearwardly extending cylindrically shaped handle receiver.

3. The winch system of claim 1 wherein the lever arm is arranged to be moved to a third location and wherein the U-shaped pivot frame is formed with a radially extended surface above the shaft openings defining a lever arm pawl detent which maintains the lever arm pawl in a retracted position when the lever arm is rotated to the third location.

4. The winch system of claim 3 wherein the shaft defines a wrench engaging surface allowing the shaft to be rotated through the wrench engaging surface independently of the movement of the lever arm when the lever arm is in the third location.

5. The winch system of claim 4 wherein the lever arm is arranged to be moved to a fourth location and wherein the lever arm and the pivot frame are arranged to move the pawls to their retracted positions when the lever arm is rotated to the fourth location.

* * * * *